Patented June 30, 1925.

1,543,763

UNITED STATES PATENT OFFICE.

CHRISTIAN J. GAMBEL, OF NEW ORLEANS, LOUISIANA.

DECOLORIZING CARBON AND PROCESS OF PRODUCING THE SAME.

No Drawing.   Application filed June 2, 1923. Serial No. 643,079.

*To all whom it may concern:*

Be it known that I, CHRISTIAN J. GAMBEL, a citizen of the United States, residing at New Orleans, in the parish of Orleans and State of Louisiana, have invented certain new and useful Improvements in Decolorizing Carbons and Processes of Producing the Same; and I do hereby declare the following to be a full, clear, and exact description of the invention, such as will enable others skilled in the art to which it appertains to make and use the same.

This invention relates to decolorizing carbons and to a process of producing the same, and has for its object to provide an article of manufacture and a method of making the same which will be more efficient in practice than those heretofore proposed.

With these and other objects in view, the invention consists in the novel steps and combinations of steps constituting the process and in the novel product produced by said process, all as will be more fully hereinafter disclosed and particularly pointed out in the claims.

In order that the precise invention may be the more clearly understood it is said: It is now well known that there has been produced a decolorizing carbon from fibrous rice materials containing combined silica and especially from rice hulls wherein the fibrous rice material is first charred, preferably out of contact with sufficient air to prevent burning up a material proportion of the carbon present, and then boiling out the raw carbon mass thus produced with a caustic soda solution or with any other suitable alkali in order to remove the resinous matter present in the material and also to remove a substantial proportion of the silica with which the cellulosic content of said material is combined. The partly finished carbon thus had is next removed from the caustic alkali solution, the resulting silicate of soda is washed from said carbon as completely as practicable, and the washed carbon is then treated with muriatic or hydrochloric acid HCl, to neutralize any caustic alkali which may remain attached to the carbon.

After the treatment with acid, the material is again washed to free it from the acid and is dried by any suitable means. The material is suitably finely subdivided preferably to the form of a very fine powder, and when applied to sugar solutions it is found to have the remarkable property of removing the color from said solutions to an extent which is from twenty to thirty times as great as that of the ordinary bone black which is in such wide public use throughout the world. But it is found when this material is made on a large commercial scale that the commercial hydrochloric acid found on the market contains so much combined iron that it requires a very considerable amount of washing to remove this iron. In fact, it has been found commercially impossible to entirely remove this iron by washing when large scale operations are considered.

The result is that this said iron which is carried into the finished decolorizing carbon sooner or later finds its way into the sugar solutions to be treated, and discolors the same to an objectionable extent. It is further found in practice that there must be an excess of hydrochloric acid employed over that theoretically required to neutralize the alkali present after the first washing process, and that this said excess of acid is absorbed or finds its way into the very minute pores with which the fibrous rice carbon is provided, so that it is impossible commercially to remove the last traces of this said acid by washing or by any chemical process except at a very excessive cost. The further result of the presence of this excess acid in the finished carbon is to retain much more of the iron impurities carried by the acid in the said carbon than would otherwise be the case, and when said excess of acid is removed by heating the carbon a still further objection is found to exist in that the vaporized acid attacks the walls of any metal containers that may be employed, as well as the walls of the furnace stack, the vents associated with the apparatus, and many other metal parts which it is necessary to use in practice. The whole problem is still further complicated by the fact that hydrochloric acid boils at a temperature higher than water, the carbon itself is a good heat insulator, and therefore in order to vaporize this acid effectually out of the partly finished carbon, it is necessary to heat the carbon to such a high temperature that the vaporized acid is chemically so active that it will attack practically any metal part whatever, with which it comes in contact, and many of these parts being of necessity made from iron, said vaporized acid produces additional iron salts which sooner or later find themselves in the sugar solutions and thus damages the resulting color of the same.

After, however, this acid is removed from the carbon as nearly as possible, the finished carbon is known to the trade as "Carbrox", and for convenience, it will be so designated hereinafter. It might be remarked that this said Carbrox has been successfully used in large scale practical operations in the decolorizing of sugar solutions, and is recognized as a valuable commercial article today.

In carrying out the new process constituting this invention now to be described, the foregoing objection are avoided by proceeding as follows: that is to say, I have found that better decolorizing results are obtained by proceeding as above outlined up to the acidifying step, and then instead of using hydrochloric acid to neutralize the alkali left in the partly finished carbon, one should, in carrying out this invention, use an acid capable of neutralizing said alkali but which has a boiling point lower than 212° F. In other words, in proceeding according to this invention, instead of hydrochloric acid, HCl, I use carbonic acid or carbon dioxide, $CO_2$, to neutralize said alkali. The use of this said $CO_2$ acid in practice may be accomplished in one of several ways. That is, I may treat the water which is to be used in washing out the alkali with $CO_2$ gas or may carbonate the same, whereupon the alkali remaining in the carbon will be washed out and neutralized at the same time. Or I may mix the partly finished carbon with carbonated water. The same results may, of course, be obtained by using carbon dioxide gas, derived from any suitable source. In fact, one may conveniently manufacture this said gas at the plant by the well known lime and coke process used in beet sugar factories for carbonating sugar solutions. In practice it is found that although carbonic acid $CO_2$ is a mild and practically harmless acid, yet it is found to be efficient in seeking out and neutralizing the caustic soda solution left in the partly finished Carbrox, and to produce better results, so far as the finished Carbrox is concerned than does the hydrochloric acid. That is to say, actual tests have shown that a decolorizing carbon made from rice hulls and by the above mentioned process employing $CO_2$ gas permits of a much greater rapidity of filtration of the sugar solutions than does Carbox made from the prior process employing hydrochloric acid. In fact, the speed of the carbonic acid gas made carbon is found to be almost twice the speed of filtration of the hydrochloric acid made carbon. The decolorizing power of the gas made carbon is found to be equal to or better than that produced by the prior process. When this said $CO_2$ gas is employed in a water solution or is conveyed to the carbon by carbonated water, it boils out of the water or vaporizes therefrom at a comparatively very low temperature, and therefore any of this gas which may be occluded in the very fine pores of the carbon is readily removed at a comparatively low temperature by heating the said carbon and thus is the overheating of the carbon avoided, which was found to be necessary in the entire removal of the hydrochloric acid heretofore employed.

A still further advantage of the use of $CO_2$ gas over the use of hydrochloric acid resides in the fact that the $CO_2$ gas does not attack any metal parts of the apparatus at all and therefore it does not produce any iron or other metal salts to be left in the carbon to later find their way into the sugar solutions to impair the color thereof. It is further found in practice that the cost of the gas treatment compares very favorably indeed with the cost of the hydrochloric acid treatment.

Although the carbon dioxide, $CO_2$, is an acid anhydride, yet, when mixed with water, $H_2O$, theoretically, it may be said to form an acid, $H_2CO_3$, whose boiling point is below that of water. Of course, other acid anhydrides would neutralize the alkali present, but carbon dioxide is preferred.

It will thus be seen that by the substitution of an acid whose boiling point is below that of water for hydrochloric acid in the production of decolorizing carbons made from fibrous rice materials, one is enabled to quickly and thoroughly remove the last traces of any acid which may be occluded in the pores of the carbon and may thus produce superior results in the subsequent treatment of sugar solutions, and at a cost which is not prohibitive commercially. It will further be seen that an acid free decolorizing carbon made from fibrous rice material is a new article of manufacture, in that it has long been sought and never heretofore been produced.

It should be remarked that it is now well known that fibrous rice material containing silica is the only vegetable material known at the present time which without air activation will under the alkali and acid treatment above mentioned produce the surprising decolorizing results above mentioned, or have, say, from twenty to thirty times the decolorizing power of bone black, when applied to sugar solutions.

It is obvious that those skilled in the art may vary the details of the procedure without departing from the spirit of the invention, and therefore I do not wish to be limited to the above disclosure except as may be required by the claims.

What is claimed is:

1. The process of making a decolorizing carbon which consists in charring fibrous rice material containing silica; treating the charred material with an alkali to remove the resins present and a substantial proportion of said silica; removing substantially all the alkali from said charred material; treating the alkali left in the carbon thus had with an acid anhydride whose boiling point is below 212° F. to neutralize said alkali; and removing said acid anhydride from the carbon thus produced.

2. The process of making a decolorizing carbon from fibrous rice material containing silica which consists in charring said material; heating said material with a solution containing an alkali metal in a combined state to remove a portion of the silica present; treating the said material with an acid anhydride whose boiling point is below 212° F. to neutralize any alkali that may be associated with the carbon thus produced; and heating the said treated carbon to remove any acid anhydride that may be associated therewith.

3. The process of making a decolorizing carbon from rice hulls which consists in charring said hulls; boiling said charred hulls in a solution of caustic soda until more than 60% of the silica present has been removed; separating said hulls from a large proportion of the free alkali employed; treating the hulls thus obtained with a solution containing free carbonic acid gas to neutralize any alkali that may be still associated with said carbonized hulls; and heating the mass thus produced to free the latter from any of said gas that may be associated therewith.

4. The process of making a decolorizing carbon from rice hulls which consists in charring said hulls; boiling said charred hulls in a solution of caustic soda until more than 60% of the silica present has been removed; separating said hulls from a large proportion of the free alkali employed; treating the hulls thus obtained with a solution containing free carbonic acid gas to neutralize any alkali that may be still associated with said carbonized hulls; heating the mass thus produced to free the latter from any of said gas that may be associated therewith; and drying the mass in a finely divided condition.

5. The process of making a decolorizing carbon from rice hulls which consists in charring said hulls; boiling said charred hulls in a solution of caustic soda until more than 70% of the silica present has been removed; separating said hulls from a large proportion of the free alkali employed; treating the hulls thus obtained with a solution containing free carbonic acid gas to neutralize any alkali that may be still associated with said carbonized hulls; heating the mass thus produced to free the latter from any of said gas that may be associated therewith; and drying the mass in a finely divided condition.

6. The process of making a decolorizing carbon from rice hulls which consists in charring said hulls; boiling said hulls in a solution of sodium hydrate until more than 80% of the silica present has been removed; washing said hulls to remove the alkali and the sodium silicate formed; treating the washed hulls with carbonic acid gas to neutralize any alkali that may still remain associated with said treated hulls; and heating said carbonic acid gas treated hulls until all objectionable traces of said gas have been removed.

7. The herein described new article of manufacture consisting of a decolorizing mass of finely divided carbonized fibrous rice material from which a substantial portion of its combined silica has been removed and which has been treated with free carbonic acid gas, and which is free from all objectionable traces of alkalis and acids.

8. The herein described new article of manufacture consisting of a decolorizing mass of finely divided carbonized rice hulls which have been treated with an alkali to remove a substantial proportion of its silica content and with a carbonic acid gas to neutralize any alkali remaining after said treatment, and which is free from any objectionable traces of acid or color deteriorating compounds.

In testimony whereof I affix my signature.

CHRISTIAN J. GAMBEL.